(12) United States Patent
Tokosch

(10) Patent No.: US 12,452,256 B2
(45) Date of Patent: Oct. 21, 2025

(54) BREACH DETECTION OF SECURED CONFIDENTIAL CONTENT SYSTEM AND METHODS

(71) Applicant: NoteAffect, L.L.C., Arnold, MD (US)

(72) Inventor: Jay P. Tokosch, Arnold, MD (US)

(73) Assignee: NoteAffect, L.L.C., Arnold (MD)

( * ) Notice: Subject to any disclaimer, the term of this patent is extended or adjusted under 35 U.S.C. 154(b) by 169 days.

(21) Appl. No.: 17/510,054

(22) Filed: Oct. 25, 2021

(65) Prior Publication Data
US 2022/0131878 A1    Apr. 28, 2022

(51) Int. Cl.
*H04L 29/06*    (2006.01)
*G06F 16/14*    (2019.01)
*G06F 21/60*    (2013.01)
*H04L 9/40*    (2022.01)

(52) U.S. Cl.
CPC ........ *H04L 63/1408* (2013.01); *G06F 16/148* (2019.01); *G06F 21/604* (2013.01); *G06F 2221/2113* (2013.01)

(58) Field of Classification Search
CPC . H04L 63/1408; G06F 16/148; G06F 21/604; G06F 2221/2133
See application file for complete search history.

(56) References Cited

U.S. PATENT DOCUMENTS

| | | | | |
|---|---|---|---|---|
| 2012/0144449 A1* | 6/2012 | Peled | ................. | G06F 21/6245 726/1 |
| 2015/0242415 A1* | 8/2015 | Martini | ............... | H04L 63/1441 707/694 |
| 2015/0244682 A1* | 8/2015 | Biswas | ................. | H04L 63/083 726/26 |
| 2016/0173511 A1* | 6/2016 | Bratspiess | ........... | H04L 63/1425 726/23 |
| 2017/0068829 A1* | 3/2017 | Shaw | ....................... | G06F 21/50 |
| 2017/0223066 A1* | 8/2017 | Grevers, Jr. | ........ | H04L 65/1083 |
| 2020/0151345 A1* | 5/2020 | Chauhan | ................. | G06F 21/16 |

\* cited by examiner

*Primary Examiner* — Ellen Tran
(74) *Attorney, Agent, or Firm* — NORTON ROSE FULBRIGHT US LLP

(57) ABSTRACT

A computer-implemented method for detecting breaches of secured confidential content can include determining that a client device has an application client running, allowing access to the content when the application client is running, causing the application client to present the content when the application is running, and receiving a notification that the client device has breached a rule for a security level of the content.

9 Claims, 3 Drawing Sheets

BREACH DETECTION OF SECURED CONFIDENTIAL CONTENT SYSTEM AND METHODS

CROSS REFERENCE TO RELATED APPLICATION

This application claims priority under 35 U.S.C. § 119(e) from U.S. Provisional Application No. 63/105,058 filed on Oct. 23, 2020, and titled "BREACH DETECTION OF SECURED CONFIDENTIAL CONTENT SYSTEM AND METHODS," the entire contents of which is incorporated herein by reference for all purposes.

BACKGROUND

1. Field

The present inventive concept relates generally to the field of breach detection of secured confidential content. In particular, the present inventive concept relates to a system operable to present content with content confidentiality and/or security levels and determining, based on generated files, port usage, and/or network traffic, whether a breach of the confidentiality and/or security levels has occurred.

2. Discussion of Related Art

When presenting confidential information to a recipient, it is desirable to do so in a manner that minimizes risk that the recipient will misappropriate the confidential information. Conventional methods to disseminate confidential information include, prior to presenting the confidential information, requiring the recipient to execute a non-disclosure agreement or the like, which is supposed to contractually prevent the recipient from disclosing the confidential information. However, non-disclosure agreements can be ineffective if, for instance, the recipient does not honor the non-disclosure agreement. Also, conventional presentation software is also ineffective at preventing misappropriation of confidential information because such lacks functionality to determine when a misappropriation has occurred or otherwise affect any preventative measures.

As such, there is a demand for a system operable to detect breaches of confidential content.

SUMMARY

The present inventive concept provides a computer-implemented system configured to allow one or more presenters to present confidential content and detect breaches of content confidentiality levels.

The system of the present inventive concept allows a first user to present confidential content to one or more other users in a meeting. The content can be associated with a content security and/or confidentiality level having various rules. For example, a security level may have a rule indicating that content cannot be screenshot, recorded, or shared with people outside of the participants of the meeting. The system can communicate with client devices of the one or more other users by utilizing a client application on respective client devices of the one or more other users. The client application can be configured to monitor a file system and/or ports and/or network traffic of the respective client devices. Additionally, the system can send the content and the content security level to the client application to be displayed on the respective client devices. When one of the one users enacts an action that breaches a rule of the security level, the client application can detect the action and identify that the action is a breach of the rule. For example, when the security level has a rule that indicates that content cannot be screenshot or shared with people outside of the participants of the meeting, the client application can monitor a file system of a client device and detect when a user has screenshot the content (e.g., by detecting a new file in a screenshot directory) and identify that the screenshot is a violation of the rule to not screenshot the content. The client application can also be configured to send a notification to the system.

In this disclosure, terminology is used to describe features of the present inventive concept. The term "algorithm" refers to logic, hardware, firmware, software, and/or a combination thereof that is configured to perform one or more functions including, but not limited to, those functions of the present inventive concept specifically described herein or are readily apparent to those skilled in the art in view of the description. Such logic may include circuitry having data processing and/or storage functionality. Examples of such circuitry may include, but are not limited to, a microprocessor, one or more processors, e.g., processor cores, a programmable gate array, a microcontroller, an application specific integrated circuit, a wireless receiver, transmitter and/or transceiver circuitry, semiconductor memory, or combinatorial logic.

The term "logic" refers to computer code and/or instructions in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium, e.g., electrical, optical, acoustical, or other form of propagated signals such as carrier waves, infrared signals, or digital signals. Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

Additional aspects, advantages, and utilities of the present inventive concept will be set forth in part in the present description and drawings and, in part, will be obvious from the present description and drawings, or may be learned by practice of the present inventive concept. The present description and drawings are intended to be illustrative and are not meant in a limiting sense. Many features and sub-combinations of the present inventive concept may be made and will be readily evident upon a study of the present description and drawings. These features and sub-combinations may be employed without reference to other features and sub-combinations.

BRIEF DESCRIPTION OF DRAWINGS

For the purposes of description, but not of limitation, the foregoing and other aspects of the present inventive concept are explained in greater detail with reference to the accompanying drawings, in which.

Figure 1:
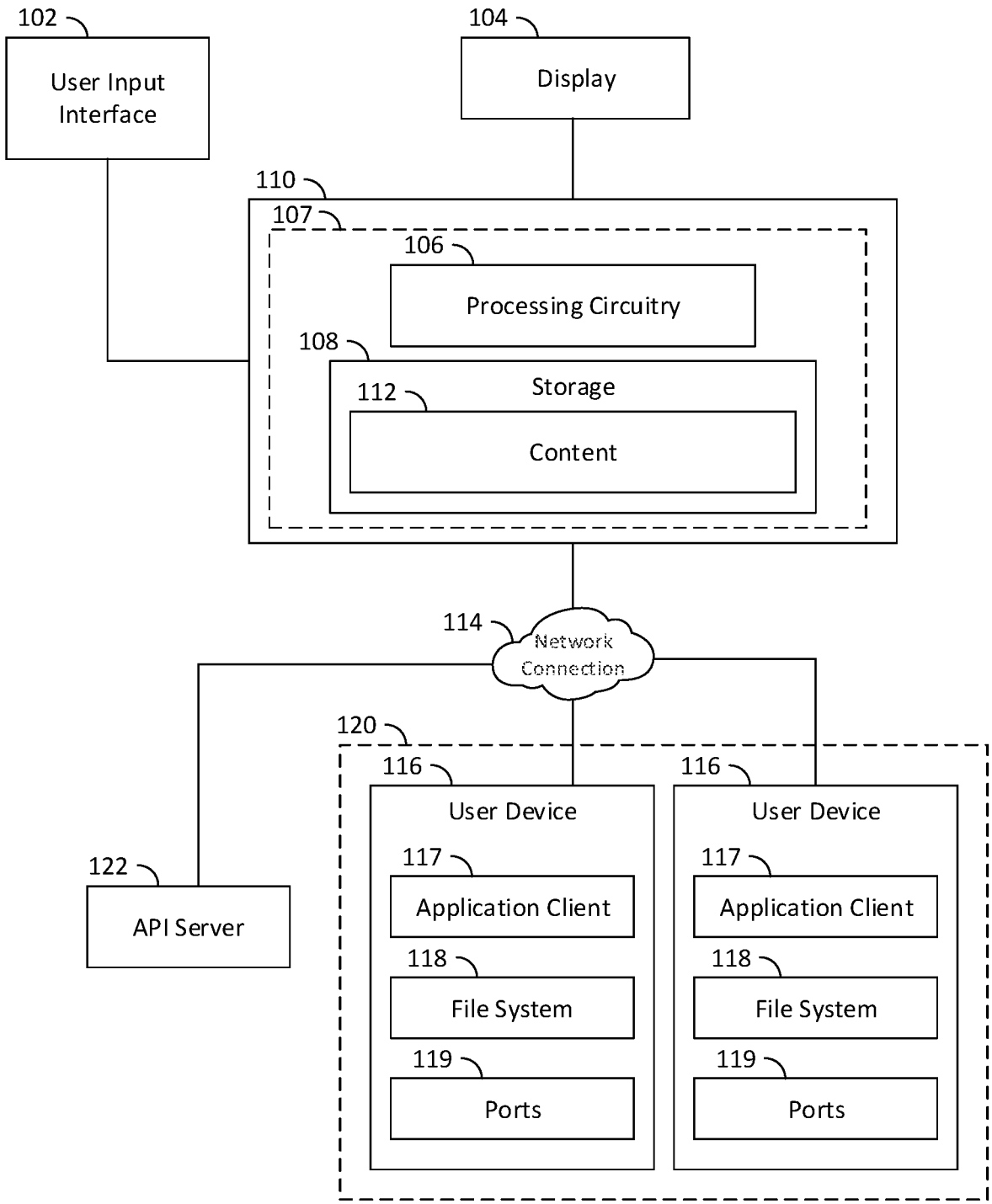
FIG. 1 illustrates a block diagram of a system of the present inventive concept.

The drawings do not limit the present inventive concept to the specific embodiments disclosed and described herein. The drawings are not necessarily to scale, emphasis instead being placed on clearly illustrating principles of certain embodiments of the present inventive concept.

DETAILED DESCRIPTION

Objects, advantages, and features of the exemplary embodiment described herein will be apparent to one skilled in the art from a consideration of this specification, including the attached drawings.

It is an object and feature of an exemplary embodiment described herein to provide a robust and reliable way of providing confidential content to one or more users. In some settings, multiple users may wish to access on their devices a media asset provided by a source device. For example, conference attendees with tablets, laptops, and/or desktops may have access to the internet provided by the conference organizer or venue hosts, either through a cellular connection, 3G, 4G, Wi-Fi connection or otherwise. While a presenter talks, moves through slides, and annotates them, attendees may want to follow the presentation on their device.

To provide an overall understanding of the systems and methods described herein, certain illustrative embodiments will now be described.

As referred to herein, an Application Program Interface (API) server is a set of routines, protocols, and tools for building software applications. The API server specifies how software components should interact and different APIs may be used when programming graphical user interface (GUI) components for different operating systems, applications or websites.

As referred to herein, a computing device means a content source device, and may be a server computing device, which may be located centrally or at distributed locations, and provides services to various types of users and devices connected via a network such as the Internet via network connection 207. The computing device may include a user equipment device, such as user computer equipment, or a wireless user communications device.

As referred to herein, the phrase "user equipment device," "user equipment," "user device," "electronic device," "electronic equipment," "media equipment device," or "media device" should be understood to encompass any device for accessing content, such as a digital storage device, a digital media receiver (DMR), a digital media adapter (DMA), a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a smart phone, or any other television equipment, computing equipment, or wireless device, and/or combination of the same.

User equipment devices can be implemented as user computer equipment, wireless user communications device, or any other type of user equipment suitable for accessing content, such as a non-portable gaming machine. For simplicity, these devices may be referred to herein collectively as user equipment or user equipment devices. User equipment devices, on which an application may be implemented, may function as a standalone device or may be part of a network of devices. Various network configurations of devices may be implemented.

As referred herein, the term "in response to" refers to initiated as a result of for example, a first action being performed in response to another action may include interstitial steps between the first action and the second action. As referred herein, the term "directly in response to" refers to caused by. For example, a first action being performed directly in response to another action may not include interstitial steps between the first action and the second action.

In the embodiment shown in FIG. 1, system 100 includes a computing device 110, in communication, for example, through a network connection 114 with user devices 116, and/or an API server 122.

Computing device 110 may communicate with a user input interface 102 and a display 104. Additionally, computing device 110 can have control circuitry 107, which can include processing circuitry 106, storage 108, content 112, and an API server 122. In this embodiment, content is synchronously shared between the computing device 110 and the user devices 116 and 118.

User input interface 102 is configured to receive inputs from a user and provide instructions to processing circuitry 106. Additionally user input interface 102 is configured to provide information to the user.

Display 104 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 104 may be HDTV-capable. In some embodiments, display 104 may be a 3D display, and the interactive media application and any suitable content may be displayed in 3D. A video card or graphics card may generate the output to the display 104. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 107. The video card may be integrated with the control circuitry 107. User devices 116 and 118 each include displays similar to display 104.

In the embodiment of FIG. 1, a presenter using computing device 110 shares data, such as a set of slides generated for display on display 104. The computing device 110 may be a computer or tablet provided by the presenter, the conference organizers, or another party.

Processing circuitry 106 can include circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 107 executes instructions for an application stored in memory (i.e., storage 105). Specifically, control circuitry 107 may be instructed by the application to perform the functions discussed above and below. For example, the application may provide instructions to control circuitry 107 to generate displays. In some implementations, any action performed by control circuitry 107 may be based on instructions received from the application. Control circuitry 107 described herein may be implemented using software running on one or more general purpose or specialized processors.

Storage 108 is configured to store and allow access to content 112. Storage 108 can be physical and/or virtual storage. For example, storage 108 may be one or more hard drives, solid state drives, hybrid drives, or any combination thereof. Furthermore, storage 108 can also be virtual storage, such as cloud storage from a separate or connected server (e.g., a server connected via network connection 114).

Computing device 110 runs a synchronization application and stores the content 112 which can be generated for display (e.g., on display 104, user devices 116, etc.). The synchronization application may be the content sharing software application referred to as the "application" in FIG. 3 below. Alternatively, the synchronization application on the computing device may be a variant of the application. The application may have the same layout on various different types of user equipment or may be tailored to the display capabilities of the user equipment.

The synchronization application may be implemented using any suitable architecture. For example, it may be a stand-alone application wholly-implemented on the computing device 110 and the user devices 116. In such an approach, instructions of the application are stored locally and data for use by the application is downloaded on a periodic basis (e.g., from an out-of-band feed, from an Internet resource, or using another suitable approach). Control circuitry 107 may retrieve instructions of the application from storage 105 and process the instructions to generate any of the displays discussed herein. Based on the processed instructions, control circuitry 107 may determine what action to perform when input is received from input interface 102. For example, movement of a cursor on a display up/down may be indicated by the processed instructions when input interface 102 indicates that an up/down button was selected.

An application may be, for example, a stand-alone application. For example, an application may be implemented as software or a set of executable instructions which may be stored in storage, and executed by control circuitry of a user device. In some embodiments, applications may be client-server applications where only a client application resides on the user equipment device, and server application resides on a remote server. For example, applications may be implemented partially as a client application on control circuitry of a user equipment device and partially on a remote server as a server application running on control circuitry of the remote server. When executed by control circuitry of the remote server, the server application may instruct the control circuitry to generate the application displays and transmit the generated displays to the user equipment devices. When executed by control circuitry of the remote server, the application may instruct the control circuitry to transmit data for storage on the user equipment. The client application may instruct control circuitry of the receiving user equipment to generate the application displays.

The application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

In FIG. 1, when the computing device sends content 112, the control circuitry 107 sends content information from the computing device 110, through network connection 114, to an API server 122. Content information can include a security and/or confidentiality level, which can include rules for users. For example, the content information can include a security level indicating that the content can be shared with anyone in a company and/or participants of the meeting. Accordingly, a rule may be that an application client 117 of user device 116 must check a user identifier (e.g., an e-mail address, login account, etc.) to determine whether the user can access the content. As another example, the security level may indicate that the content cannot be shared with anyone else. Accordingly, a rule may be that users cannot print out, email, and/or otherwise share the content, even when access is allowed.

Users can request access to content 112 through user devices 116. User devices may have an application client 117, a file system 118, and ports 119.

Application client 117 is configured to request, receive, and present content 112. More specifically, application client 117 can send requests to computing device 110 for content 112. Application client 117 can then receive content 112, with or without security levels associated thereto. In some embodiments, the requests and receipts of content 112 may be handled through API server 122.

File system 118 can be any file system configured to store and allow a user access to files stored therein. File system 118 can be a local file system and/or a virtual or cloud based file system. In one example, a user may attempt to generate a screenshot of content 112. The screenshot would then reside somewhere in file system 118.

Ports 119 can be both physical and software ports. For example, ports 119 can include both physical Universal Serial Bus (USB) ports and Transmission Control Protocol (TCP) ports. Ports 119 can be configured to allow communication between user device 116 and other computers and/or peripheral devices. For example, a user may attempt to screenshot content 112 when content 112 is displayed on client device 116. Thus, at least one port 119 would then be opened for screensharing.

Application client 117 is configured to monitor file system 118 and ports 119 of the respective user device 116. For example, when a screenshot is generated as a file in file system 118, application client 117 can identify that the file has been generated (e.g., in a screenshot directory). As another example, application client 117 can identify when a port 119 (e.g., a port that is typically used for screensharing) has been opened. Furthermore, application client 117 can monitor upload network traffic (e.g., through ports 119). In some embodiments, application client 117 can monitor the upload network traffic in intervals (e.g., five second intervals), to identify regular network activity. For example, a typical voice call (e.g., Voice over Internet Protocol (VoIP))

utilize or send approximately 10 kilobits per second (kbps) of data. Thus, if application client 117 detects more than 100 kb of upload network traffic during a 5 second interval (e.g., through port 119), application client 117 can conclude that there is some unusual upload. Additionally, application client 117 can also continue monitoring the upload network traffic to determine whether this upload network traffic was due to screen sharing. For example, if the upload network traffic continues a high pattern of uploaded data for an extended period of time (e.g., 600 kb over 30 seconds), application client 117 can conclude that that the upload network traffic indicates screen sharing activity. It is to be understood that the values used are for explanatory purposes only and that one skilled in the art can conduct additional analysis to determine more precise values for similar scenarios. For example, the values can be higher due to the nature of a video conference, in which members of the video conference are also sharing a video of themselves.

Additionally, application client 117 can be configured to send a notification that a file has been generated and/or a port has been used. For example, a security level may indicate that users are not allowed to share content 112 with anyone else. Thus, a rule may be to detect when users screenshot the content 112, records a screen of user device 116 with content 112 thereon, etc. Accordingly, when a user violates the security level, application client 117 can send a notification to a presenter (e.g., a user utilizing computing device 110) that a breach of the security level has occurred.

Application client 117 can also be configured to protect the security of content 112. For example, after application client 117 has detected that content 112 is being shared in violation of a rule and/or security level, application client 117 can close or cause user device 116 to stop viewing content 112 (e.g., by closing a content web-browser tab displaying content 112, rescinding access to content 112, etc.).

In an exemplary embodiment, the API server 122 is a remote server, and the one way synchronization between the computing device 110 and the API server 122 is performed at fixed time intervals. In an alternative embodiment, synchronization may be two-way synchronization, in the event that a backup may be retrieved from the API server 122 to restart a presentation at the last played position on computing device 110. Transfer of data from the computing device 110 to the API server 122 may be done via network connection 114 which may be a network server such as a Wi-Fi or cellular network.

API server 122 can also be configured to facilitate communication between computing device 110 and user devices 116. For example, API server 122 can be a proxy for receiving requests from client devices 116 and sending the request to computing device 110. Additionally, API server 122 can be configured to facilitate communication between client application 117 and computing device 110. For example, API server 122 can be configured to process notifications from client application 117 about breaches by users and report the breaches to a presenter (e.g., a user utilizing computing device 110).

A network connection such as network connection 114 may include communication paths which couple user equipment devices and the computing device directly or indirectly. The network connection may use one or more networks including the Internet, a radio communications network, a mobile phone network, mobile voice or data network (e.g., a 4G or LTE network), cable network, public switched telephone network, or other types of communications network or combinations of communications networks. Communication paths may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Communication paths may also include other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC.

Requests, commands and other suitable data may be sent using control circuitry. An input/output path may connect control circuitry to one or more communications paths.

Figure 2:
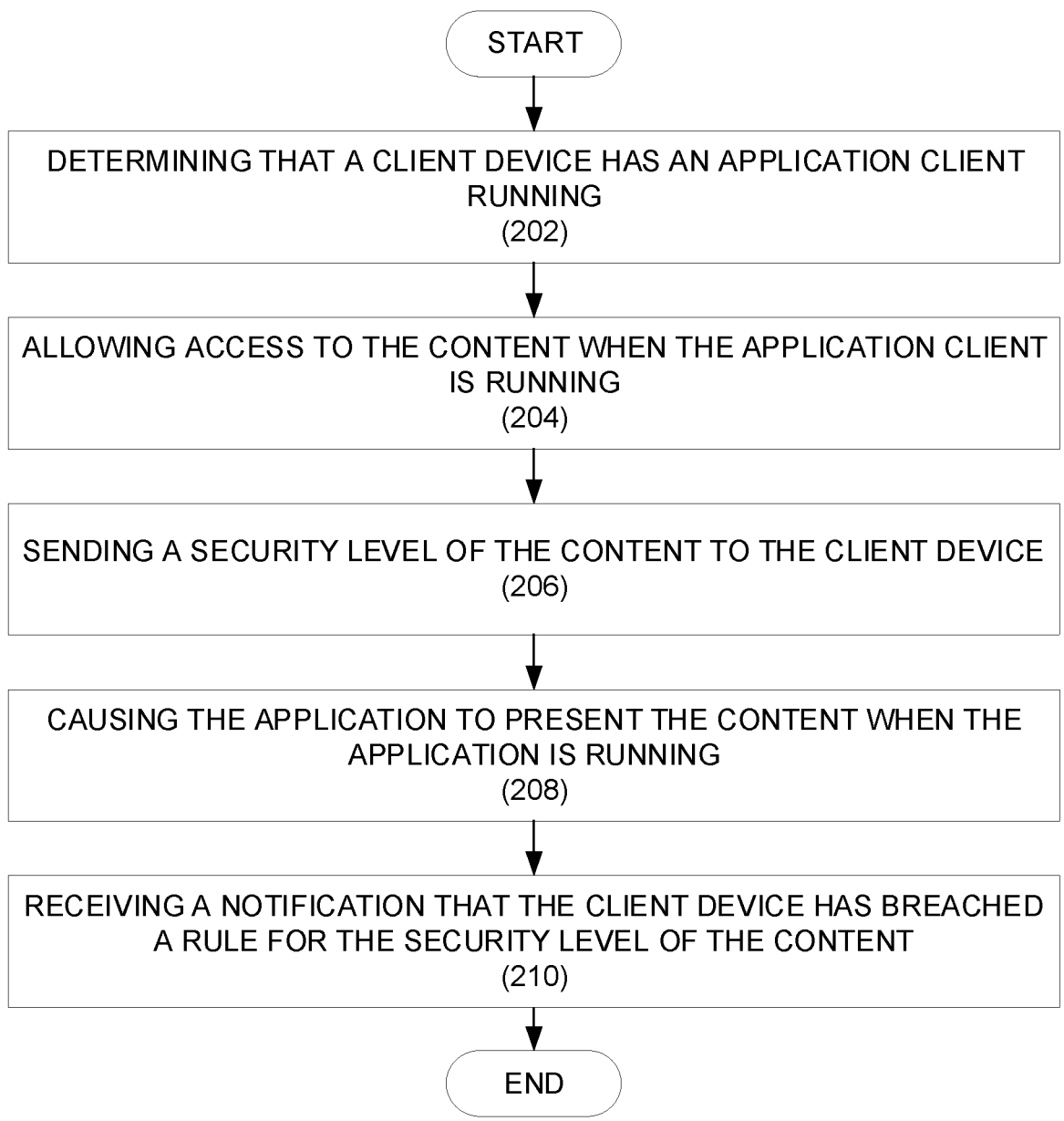
FIG. 2 illustrates a method diagram from a server perspective of the present inventive concept.

FIG. 2 illustrates an example method 200 for detecting breaches of secured confidential content. Method 200 can be implemented from a perspective of a computing device or server, such as computing device 110 and/or API server 122. Similarly, it is also contemplated that method 200 can be implemented by a user device, such as user device 116. For clarity and discussion purposes, method 200 will be described from a perspective of computing device 110.

Method 200 begins at step 202, in which computing device 110 determines that a client device (e.g., user device 116) has an application client running. For example, computing device 110 can receive a packet or other data from a client application (e.g., client application 117).

At step 204, computing device 110 can allow access to content when the application client is running on the client device. For example, computing device 110 can allow client application 117 to access content 112 when client application 117 is running on user device 116.

At step 206, computing device 110 can send a security level of the content to the client device. The security level of the content can indicate one of a variety of security levels. For example, the security level of the content can indicate that the content can be shared with anyone, the content can be shared with anyone associated with a company associated with the content, the content can be shared only with other participants in a meeting with the content presented, and/or the content cannot be shared with anyone else.

At step 206, computing device 110 can cause the application client to present the content when and/or while the application client is running.

At step 208, computing device 110 can receive, from the application client, a notification that the client device has breached a rule for the security level of the content. For example, the breach can be a screenshot, screen recording, and/or screen recording. In some embodiments, the application client can be configured to search a file system of the client device and identify files generated and stored in the file system as the breach. Similarly, in some embodiments, the application client can be configured to monitor ports of the client device and identify usage of the ports as the breach.

Figure 3:
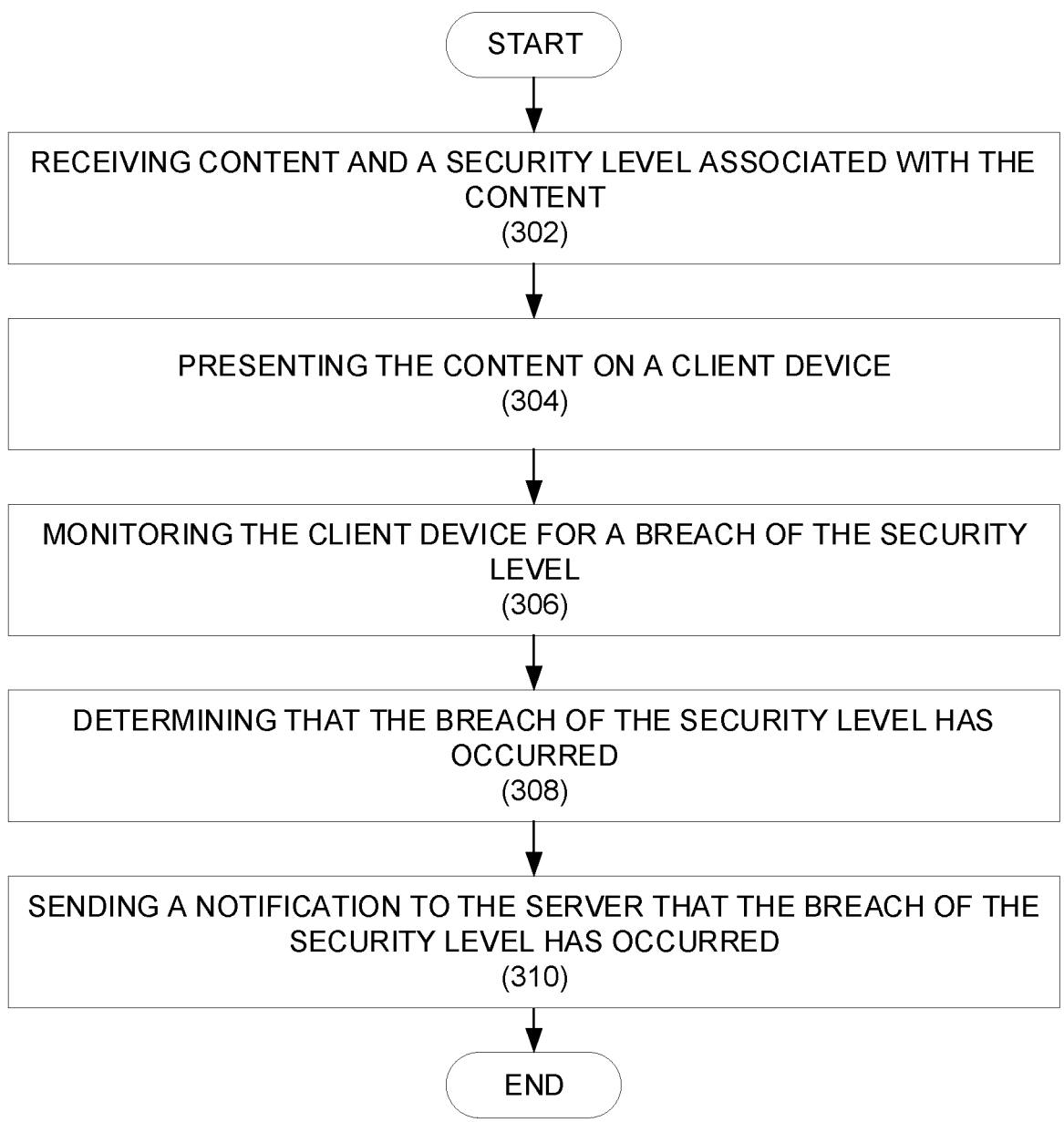
FIG. 3 illustrates a method diagram from a client application perspective of the present inventive concept.

FIG. 3 illustrates an example method 300 for detecting breaches of secured confidential content. Method 300 can be implemented from a perspective of a user device, such as user device 116, and/or a client application, such as client application 117. For clarity and discussion purposes, method 300 will be described from a perspective of client application 117.

Method 300 begins at step 302, in which a client application receives content and a security level associated with the content.

At step 304, the client application can present the content on a client device. For example, the client application can communicate with a display and provide instructions to the display to present the content.

At step 306, the client application can monitor the client device for a breach of the security level. For example, the client application can monitor a file system and/or ports of the client device.

At step 308, the client application can determine that the breach of the security level has occurred. For example, the client application can identify that a screenshot has been generated as a file in the file system and/or that a port used for screensharing has been opened.

At step 310, the client application can send a notification to a server that the breached of the security level has occurred. In some embodiments, the notification can include identifying information, such as the location of the file, port used or opened, user associated with the client device, etc.

What is claimed is:

1. A computer-implemented method comprising:
   associating content from a presenter with a rule indicating the content should not be shared;
   determining that a client device has an application client running, the application client configured to access and present the content from the presenter;
   allowing access to the content when the application client is running;
   causing the application client to present the content when the application client is running;
   causing a port of the client device used for screensharing to be monitored based on the application client receiving the rule indicating the content should not be shared;
   detecting, using the application client, that screensharing of the content is occurring at the client device based on a bandwidth of outbound network traffic at the port exceeding a network traffic upload value associated with the rule during a monitoring interval;
   receiving, from the application client, a notification of a breach indicating that the client device has breached a rule for a security level of the content, the breach being determined based on the detecting that the screensharing of the content is occurring; and
   reporting the notification to a device associated with the presenter.

2. The computer-implemented method of claim 1, wherein,
   the application client is configured to identify network traffic in intervals and determine a type of outbound network traffic.

3. The computer-implemented method of claim 1, further comprising: prior to causing the application client to receive the notification, sending the security level of the content to the client device.

4. The computer-implemented method of claim 1, wherein the security level of the content indicates one of:
   (i) the content can be shared with anyone,
   (ii) the content can be shared with anyone associated with a company of the presenter,
   (iii) the content can be shared only with other participants in a meeting with the content, or
   (iv) the content cannot be shared with anyone else.

5. A computer-implemented method comprising:
   associating content from a presenter with a rule associated with a security level indicating the content should not be shared;
   receiving, from a computing device, the content and the security level associated with the content;
   receiving, from the computing device and at an application client on a client device, the rule for the security level of the content, the rule indicating that the content should not be shared, and the rule includes one or more screensharing upload value used for detecting screensharing activity;
   presenting the content on the client device;
   causing a port of the client device used for screensharing to be monitored based on the application client receiving the rule indicating the content should not be shared;
   detecting, using the application client, that screensharing of the content is occurring based on network traffic indicating an upload pattern with an upload rate maintained for a predetermined time interval which exceeds the one or more screensharing upload value associated with the rule received from the computing device at the client device; and
   sending a notification to a server that a breach of the security level has occurred based on the detecting of the screensharing of the content.

6. A computer-implemented method comprising:
   associating content from a presenter with a rule associated with a security level indicating the content should not be shared;
   receiving, from a computing device, the content and the security level associated with the content;
   receiving, from the computing device and at an application client of a client device, the rule for the security level of the content, the rule indicating that the content should not be shared, and the rule includes one or more screensharing upload value used for detecting a screensharing activity;
   presenting the content on the client device;
   monitoring usage of a port of the client device used for screensharing to detect outbound network traffic in response to receiving the rule indicating that the content should not be shared;
   determining that a bandwidth of the outbound network traffic exceeds the one or more screensharing upload threshold value during a monitoring interval;
   determining that a breach of the security level has occurred based on the bandwidth of the outbound network traffic exceeding the one or more screensharing upload value indicating an occurrence of the screensharing activity; and
   sending a notification to a server that the breach of the security level has occurred.

7. The computer-implemented method of claim 6, further comprising: detecting that a port associated with screensharing has been opened, the determining that the bandwidth of the outbound network traffic exceeds the one or more screensharing upload threshold value is based on monitoring the port associated with screensharing.

8. The computer-implemented method of claim 6, wherein the rule indicates a first screensharing upload value associated with a voice call and a second screensharing upload value associated with a video conference call.

9. The computer-implemented method of claim 8, wherein the second screensharing upload value is greater than the first screensharing upload value.

* * * * *